United States Patent

[11] 3,617,747

| [72] | Inventors | Charles D. Wilkinson<br>Livermore;<br>Bruce C. Meyer, Los Altos Hills, both of Calif. |
|---|---|---|
| [21] | Appl. No. | 762,949 |
| [22] | Filed | Sept. 26, 1968 |
| [45] | Patented | Nov. 2, 1971 |
| [73] | Assignee | General Electric Company |

[54] DETECTING MINUTE AMOUNTS OF RESIDUAL CORE MATERIAL BY MEANS OF NEUTRON RADIOGRAPHY
6 Claims, 1 Drawing Fig.

[52] U.S. Cl............................................... 250/83.1,
164/132, 250/106
[51] Int. Cl............................................... G01t 3/00
[50] Field of Search............................................. 250/83.1,
106 T; 164/132

[56] References Cited
UNITED STATES PATENTS
| 2,502,337 | 3/1950 | Moir.............................. | 164/132 |
| 3,237,009 | 2/1966 | Warman et al. ............... | 250/83.1 |
| 3,315,076 | 4/1967 | Jordan........................... | 250/106 T |
| 3,351,760 | 11/1967 | Brown........................... | 250/106 T |
| 3,359,419 | 12/1967 | Kastner et al................. | 250/83.1 |

*Primary Examiner*—Archie R. Borchelt
*Attorneys*—Ivor J. James, Jr., Samuel E. Turner, John R. Duncan, Frank L. Neuhauser, Oscar B. Waddell and Melvin M. Goldenberg

ABSTRACT: A method of detecting very small amounts of residual core material remaining in inaccessible internal passages in a cast metal article is disclosed. Typically, a very small amount of a material having a high neutron absorption cross section, such as gadolinium oxide, is mixed into the core material. After the metal article is cast and the core material removed, such as by dissolving the core away, a neutron radiograph of the article is prepared. Any remaining particles of the doped core material are very distinctly visible in the radiograph. This system is capable of detecting about 0.5 milligram particles.

PATENTED NOV 2 1971 3,617,747
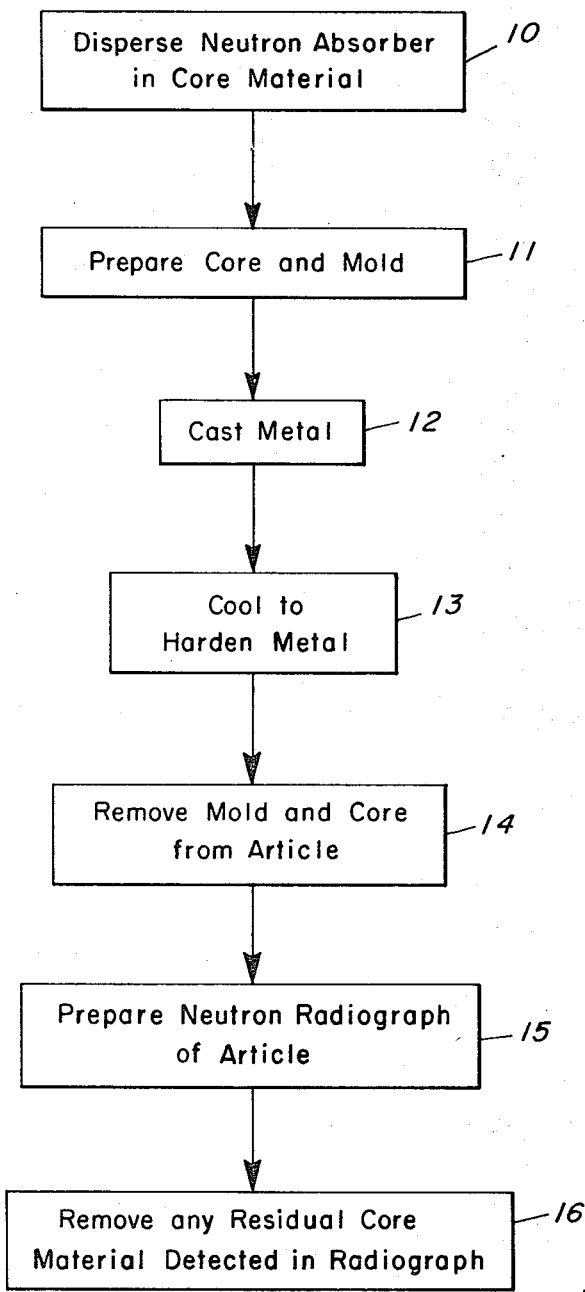
INVENTORS:
CHARLES D. WILKINSON
BRUCE C. MEYER
BY: John R Duncan
ATTORNEY:

DETECTING MINUTE AMOUNTS OF RESIDUAL CORE MATERIAL BY MEANS OF NEUTRON RADIOGRAPHY

BACKGROUND OF THE INVENTION

The casting of metal articles in molds is an old and well-developed art. The manufacture of production parts by foundry methods consists of heating the selected metal to a temperature sufficiently high to change it into a liquid state, pouring the liquid into a properly formed mold, and allowing it to solidify; then, cleaning the cast parts by removing cores, gates, etc. to make them acceptable for further processing steps or for direct use.

Molds for use in metal foundry operations may be formed from a wide variety of materials. Where the metal article has a complex shape and contains complex inner recesses the mold and cores are conventionally formed from compacted sand. After the article has been cast, the sand mold is broken or dissolved away.

It is of the utmost importance that all of the mold and core materials be removed. Particles of sand in or on metal surfaces which are to be machined will cause severe wear or damage to machine tools. Also where the article, such as a turbine blade, is to be used in a device rotating at high speed particles of core material remaining in inaccessible recesses within the article will upset the dynamic balance of the turbine or other rotating device and cause vibration, resulting in excessive wear or other damage and will restrict the flow of gases or coolants through the recesses.

Where the core and resulting internal recess has a complex shape it is very difficult to detect residual particles of core material remaining in the recesses after the core removal operation. Many attempts have been made to develop techniques for detecting residual core materials. For example, the recesses may be probed with flexible members to attempt to dislodge any remaining particles. Also, the recesses may be filled with a measured quantity of a liquid which will reveal hidden core material by filling the recess to a greater than expected extent. Attempts have been made to use X-radiography and other radiographic techniques to detect core material remaining in hidden recesses. However, standard X-radiography is much more sensitive to the metal of which the article is comprised and is relatively insensitive to the core material, thus, thick metal sections will tend to obscure and prevent detection of residual core material. None of these techniques has been found to be sufficiently accurate where removal of even very small particles must be assured.

Thus, there is a continuing need for improved techniques for insuring complete removal of residual core materials after metal casting operations.

SUMMARY OF THE INVENTION

It is, therefore, an object of this invention to provide a residual core material detecting system overcoming the above-noted problems.

It is another object of this invention to provide a residual core material detecting system of high sensitivity and reliability.

It is another object of this invention to provide a nondestructive residual core material detecting a method which is capable of being used on a regular production basis.

The above objects, and others, are accomplished in accordance with this invention by incorporating into the core material a small amount of a material having a high neutron absorption cross section. Cores are formed from the doped core material, the metal articles are cast and the core is removed in a conventional manner. Then a neutron radiograph is prepared of the metal article. Since the metal article tends to be substantially transparent to the neutrons, while the doped core material strongly absorbs neutrons, the residual core material will show up very distinctly in the resulting neutron radiograph.

This technique may be used in the casting of any suitable metal or other material which is not a strong absorber of neutrons. Any suitable core material may be used in the process of this invention. Typical core materials include sand, loam-sand mixtures, etc. The core material may include any suitable binder. Typical core sand binders include linseed oil, rosin, molasses, fish oil, and mixtures thereof. In addition, additives such as wheat flour may be included to increase the strength of the core.

The neutron absorbing additive may be any suitable material having the desired high neutron absorption cross section. Since generally neutron radiographs are produced using neutrons having thermal or resonance energy levels, it is generally preferred that the neutron absorbing material have a high absorption cross section for thermal neutrons. Typical materials having high thermal neutron absorption cross sections include boron-10, cadmium, europium, gadolinium, samarium, dysprosium, hafnium, and mixtures thereof. The neutron absorbing material may be in any suitable chemical form. Generally, it is preferred that the neutron absorbing material be in the oxide form since this is less reactive with core materials and with typical casting metals. Of course, the material may be added in the elemental form or in any suitable compound form, such as a carbide, nitrate, halide, etc. The neutron absorbing material may be added to the core materials in any suitable proportions. In general, the higher the neutron absorption cross section of the additive, the smaller the quantity required to give the desired imaging characteristics. In general from about 0.5 to about 6 weight percent of the better neutron absorbing materials will produce good images. Considerably larger amounts of less effective neutron absorbing materials may be required. Optimum results have been obtained with gadolinium oxide in the range of about 1 to about 4 weight percent in the core material. Gadolinium has a very high neutron absorption cross section and thus produces excellent images with very small amounts in the core. Also, gadolinium oxide does not adversely affect the core formation properties of the core materials and gadolinium oxide is not reactive with the usual casting metals. Other gadolinium compounds may also be used, where suitable.

BRIEF DESCRIPTION OF THE DRAWING

The concept of this invention is further pointed out in the drawing, which shows a simple flow sheet for the process of this invention.

As seen in the FIGURE, the first step in this novel process is the dispersing of the desired quantity of a material having a high neutron absorption cross section throughout the casting core material, as indicated in box 10. Next, as indicated in box 11, the mold and core are formed by conventional methods, using the doped core material. If desired, the molding material used to form the exterior surfaces of the article could also be doped with the high neutron absorption cross section material. This may be especially desirable where the exterior surface has deep, hidden recesses. The term "core" refers to that portion of a mold which is at least partially surrounded by the casting material during casting.

After the mold is prepared, molten metal is poured therein-to, as indicated in box 12. The metal is allowed to solidify by cooling (box 13), then the article is removed from the mold, and the core is removed by conventional methods (box 14).

A neutron radiograph of the article is prepared (box 15) using any suitable source of neutrons. A port in a nuclear reactor is preferred, since this will produce the desirable high neutron flux. Preferably, thermal neutrons are used for the radiography since the best neutron absorbers are much more effective with thermal neutrons than with epithermal or fast neutrons. Thus, images of much greater contrast result when thermal neutrons are used.

It is strongly preferred that the neutron beam have a ratio of thermal neutrons to gamma radiation of at least about $10^4$ thermal neutrons/ milliroentgen of gamma radiation A higher proportion of gamma radiation has been found to degrade image quality, since the gamma radiation exposes the usual detector materials, such as radiographic film, without interacting with the doped core material. The neutron flux should be at least about $5\times10^4$ neutrons/cm.$^2$-sec to avoid undesirably long exposure and image degradation due to exposure of the film to other radiation at low levels for extended periods.

Preferably, the neutrons passing through the object impinge on a converter plate containing a neutron absorber such as gadolinium or indium. Neutrons striking the converter plate cause the emission of electrons or gamma rays which strike a detector, such as conventional silver halide X-ray film, placed adjacent the converter plate. After conventional photographic development, an image is seen on the film corresponding to the article. Areas in which neutrons were absorbed will appear lighter against a dark background. The metal article will itself absorb or scatter some neutrons, and will appear in varying shades of gray corresponding to varying metal thickness. Pieces of core material containing the dopant, which absorb neutrons to a high degree, will appear as light gray or white spots.

Any residual core material seen in the radiograph is removed from the article (box 16) and the article is ready for use. This technique is especially well suited for use as a production line quality control technique in the manufacture of items, such as turbine blades, where it is of critical importance that all core material be eliminated. Radiographs of all castings may be prepared after initial core removal on a routine basis, with those showing residual core material being given further treatment.

If desired, other neutron radiographic-imaging techniques may be used. For example, a fluorescent screen could be used to form the visible image instead of radiographic film. Also, track-registration techniques, such as are described in copending U.S. Pat. application Ser. No. 601,112, now U.S. Pat. No. 3,457,408 filed Dec. 12, 1966, may be used to produce the visible radiographic image.

Details of the invention and of the results obtainable therewith will be further understood upon reference to the following examples. These examples point out various preferred embodiments of the present invention. All parts and percentages are by weight unless otherwise indicated.

EXAMPLE I

A plurality of turbine blade castings having extensive internal recesses are produced and examined by neutron radiography for residual core material. The plurality of molds are prepared in a conventional manner by firstly filling a molding flask with sand and tightly shaping it around a pattern defining the exterior surfaces of the desired casting. A core sand mixture consisting of about 40 parts sharp sand (silicon dioxide), 20 parts molding sand, three parts linseed oil, three parts wheat flour, and two parts water (all parts by volume) is prepared. The ingredients are mixed well together and then divided into four portions. The first portion is directly used to form molding cores. The cores are formed by pressing the core mixture into the desired shape, and then heating the core to drive off moisture and harden the material. About 3 weight percent gadolinium oxide in finely divided form is mixed with the second portion of the molding sand, then cores are formed from this portion. About 15 weight percent finely divided boron carbide is mixed with the third portion of molding sand, then cores are formed from this portion. About 40 weight percent europium oxide in finely divided form is intimately mixed with the third portion of core molding sand, then cores are formed from this portion.

The cores and molds prepared as described above are assembled and molten Inco 713, a nickel-base alloy, is poured into each. After the metal has solidified and the casting cooled to about room temperature, the castings are removed from the mold. The cores are removed by soaking in a molten salt bath (Kolene 01). For the purposes of this experiment, minimal efforts are made to remove the core material so that small amounts of core material are likely to have been left within the castings.

A neutron radiograph of each casting is then prepared. Each casting is placed adjacent a 3-mil gadolinium foil secured to a 1/16-inch aluminum stiffening sheet, inside a light tight X-ray cassette with a sheet of Type T X-radiographic film, available from Eastman Kodak Company, in a nuclear test reactor and exposed to the neutron flux of about $2\times10^5$ neutrons/cm.$^2$-sec for about 30 minutes. Neutrons passing through and around the castings strike the converter sheet. The gamma and beta radiation emitted by the conversion sheet as a result of the neutron irradiation strike a sheet of conventional X-ray photographic film which is placed adjacent the converter sheet. The photographic film is then developed in a conventional manner. The film shows areas of high neutron flux as dark areas while areas in which the neutron flux reaching the converter sheet was attenuated by absorption in the object appear lighter. The radiographs of castings prepared using cores without the neutron absorbing additives do not indicate any residual core material remaining withing the casting. However, careful examination of the castings, including probing of internal recesses, reveals that appreciable quantities of core material remained. The radiographs of the castings prepared using the core materials prepared from the second, third and fourth portions which included the neutron absorbing additive show clear indication of residual core material as light gray areas on the neutron radiographs. However, the quality of the core containing 40 percent europium oxide is not high from a casting point of view. Careful examination of the castings indicates that flakes of core material as small as about 0.5 mg. are detectable in the neutron radiographs.

EXAMPLE II

A plurality of castings are prepared as described in example I above. However, in this case, the core materials are divided into five portions. The first portion does not include a neutron absorbing additive. The remaining four portions contain about 0.2, 1, 3 and 30 weight percent gadolinium oxide, respectively, in finely divided form dispersed throughout the core material. Castings using these core materials are produced as described above, then minimal attempts are made to remove the core material from the castings. Neutron radiographs are prepared as described above, Again, the radiographs of the castings prepared using core material having no neutron absorbing additive do not indicate the presence of residual core material. The presence of residual core material is apparent in the radiographs of the turbine blades prepared using the other four portions of the core material having varying amounts of neutron absorbing material therein. The cores having at least 1 weight percent gadolinium oxide produce excellent images showing particles of residual core material as large as 0.5 mg. and larger. Thus, optimum results are indicating with some 3 weight percent gadolinium oxide since smaller amounts tend to produce less distinct images and greater amounts are uneconomic and eventually interfere with the physical properties of the core material.

Although specific components and proportions have been described in the above examples, other suitable materials as indicated above may be used with similar results. In addition, other materials may be added to the core material or casting metal to enhance or otherwise modify their properties.

Other modifications and applications of the present invention will occur to those skilled in the art upon reading this disclosure. These are intended to be included within the scope of this inventions.

We claim:

1. A process for detecting minute amounts in the order of about 0.5 milligram and larger of residual core material in a cast hollow metal object after removal of the core has been attempted, comprising the step of adding a small amount of a material having a high neutron absorption cross section to said core material before casting so that the presence of residual core material is readily detectable by neutron radiography transmission techniques.

2. The process according to claim 1 wherein from about 0.5 to about 6 weight percent of said material having a high neutron absorption cross section is dispersed throughout said core material before said casting operation.

3. The process of claim 1 wherein said material having a high neutron absorption cross section is an additive containing gadolinium.

4. The process according to claim 3 wherein the additive containing gadolinium is present in the core material from about 1 to about 4 percent.

5. The process according to claim 1 in which the subsequent step of preparing a neutron radiograph is practiced by exposing said cast hollow metal object to a neutron flux of at least about $5 \times 10^4$ neutrons/cm.$^2$-sec.

6. The process according to claim 5 wherein said neutron flux includes primarily thermal neutrons and the ratio of thermal neutrons to gamma radiation is at least about $10^4$ thermal neutrons/milliroentgen of gamma radiation.

* * * * *

UNITED STATES PATENT OFFICE
CERTIFICATE OF CORRECTION

Patent No. 3,617,747　　　　　　　　　　Dated　November 2, 1971

Inventor(s) Charles D. Wilkinson and Bruce C. Meyer

It is certified that error appears in the above-identified patent and that said Letters Patent are hereby corrected as shown below:

Column 1, line 9, "pouting" should be --pouring--. Column 2, line 73, there should be a period after "radiation". Column 3, line 72, "01" should be --#1--. Column 4, line 20, "withing" should be --within--; and line 66, "inventions" should be --invention--.

Signed and sealed this 6th day of June 1972.

(SEAL)
Attest:

EDWARD M. FLETCHER, JR.　　　　　　ROBERT GOTTSCHALK
Attesting Officer　　　　　　　　　　Commissioner of Patents